United States Patent [19]
Hayashi et al.

[11] Patent Number: 5,970,589
[45] Date of Patent: Oct. 26, 1999

[54] SIMULTANEOUS BIAXIAL STRETCHING APPARATUS AND METHOD

[75] Inventors: Masanori Hayashi, Hikari; Tadashi Takata; Jun-ichi Kanamoto, both of Kudamatsu, all of Japan

[73] Assignee: Hitachi, Ltd., Tokyo, Japan

[21] Appl. No.: 09/141,165

[22] Filed: Aug. 27, 1998

[51] Int. Cl.$^6$ ............................................... D06C 3/04
[52] U.S. Cl. .......................... 26/73; 26/89; 26/93
[58] Field of Search .................................. 26/72, 73, 89, 26/93, 94, 96; 264/288.4, 290.2; 198/838, 812

[56] References Cited

U.S. PATENT DOCUMENTS

| | | | |
|---|---|---|---|
| 3,611,479 | 10/1971 | Wicksall | 26/72 |
| 4,614,011 | 9/1986 | Nicholas et al. | 26/73 |
| 4,637,103 | 1/1987 | Hutzenlaub | 26/73 |
| 4,679,283 | 7/1987 | Forrest, Jr. | |
| 5,081,750 | 1/1992 | Molz | 26/73 |
| 5,161,674 | 11/1992 | Rutz et al. | 26/73 |
| 5,265,313 | 11/1993 | Rutz | 26/73 |
| 5,402,556 | 4/1995 | Rutz | 26/73 |
| 5,613,284 | 3/1997 | Hosmer | 26/83 |
| 5,797,172 | 8/1998 | Hosmer | 26/93 |

FOREIGN PATENT DOCUMENTS

| | | |
|---|---|---|
| 62-147520 | 9/1987 | Japan . |
| 6422531 | 1/1989 | Japan . |
| 412957 | 1/1992 | Japan . |

*Primary Examiner*—Amy B. Vanatta
*Attorney, Agent, or Firm*—Antonelli, Terry, Stout & Kraus, LLP

[57] ABSTRACT

Disclosed are an apparatus and method for simultaneously biaxially stretching a film (e.g., a continuous web of film). The apparatus includes upper and lower rails, for guiding a pair of endless links that each has link units for grasping side edges of the film. The endless links have upper and bottom rollers for being guided by (e.g., rolling on) the rails. The upper and bottom rollers are guided respectively by the upper and lower rails in different zones of the apparatus, the endless links being lifted and guided by the upper rail in one zone and being supported and guided by the lower rail in another zone. Since rolling, rather than sliding, friction occurs during movement of the endless links, amount of lubricant needed is decreased and dirt in the system due to large amounts of lubricant used, can be reduced. In response to a change of direction of movement of the endless link, the upper and bottom rails are sheared, so the upper and lower rollers can travel in the direction of movement; as a result, stabilized high-speed travel is possible, and bearing life can be extended.

17 Claims, 6 Drawing Sheets

SIMULTANEOUS BIAXIAL STRETCHING APPARATUS AND METHOD

BACKGROUND OF THE INVENTION

The present invention relates to an apparatus and method for stretching a film simultaneously in two (biaxial) directions (e.g., both the film travel direction and the film width direction).

In Japanese Laid-open patent No. 4 - 12957, one guiding mechanism for a simultaneous biaxial stretching machine for a film is disclosed. The guiding mechanism is composed of a roll bearing that rolls between vertical side walls of a guidance groove and a thrust bearing which receives a link weight for sliding on a bottom surface in the guidance groove.

Another example of a guiding mechanism for a width stretching machine is disclosed in the Japanese Laid-Open Utility Model No. 1987 - 147520. The disclosed structure has a roll bearing that travels along a guidance rail while receiving its own weight and a roll bearing that guides along the guidance rail.

In the above disclosure, because the weight of a whole link is large, running friction or sliding friction caused by supporting the weight of the link in the operation mode is also large. It is difficult to drive the link at high speed travel. In addition, there is a problem of scattering lubricant to the film, which is a cause of dirt, because of the necessity of applying a lubricant to the slide part.

A complex structure is required in order to combine the roll bearing used in the width stretching machine into the simultaneous biaxial stretching machine. However, it is actually difficult to adopt it, since a thrust load which acts on the roll bearing shortens the life of the roll bearing and a rail.

SUMMARY OF THE INVENTION

It is an object of the present invention to provide an improved apparatus and method for simultaneously biaxially stretching a film.

It is another object of the present invention to provide an apparatus and method, including guiding structure and technique, for simultaneously biaxially stretching a film with a high speed, and which are more stabilized in an operation mode.

It is another object of the present invention to provide an apparatus and method for simultaneously biaxially stretching a film which extends the life of use of parts such as a bearing.

Further purposes of the present invention are to provide an apparatus and method for simultaneously biaxially stretching a film which can decrease dirt due to oil scattering.

In order to achieve the above objects, according to one aspect of the present invention, there is provided a pair of movable carriers each having clips to grasp the edges of a continuous web of film, the pair of movable carriers having upper rollers and bottom rollers;

a pair of guides for guiding said movable carriers, said pair of guides defining a simultaneous stretching area wherein said guides diverge to stretch said web in the film width direction (transverse to the direction of film travel) and simultaneously stretch the film longitudinally in the direction of film travel by acceleration of the film between said carriers;

each guide having a bottom rail supporting one of the pair of movable carriers by said bottom roller and an upper rail lifting said movable carrier by said upper roller and supporting said movable carrier in an upper position.

In addition, a supporting condition wherein said movable carrier is supported by said bottom roller and a lifting condition wherein said movable carrier is lifted by said upper roller and moves while lifted are alternately exchanged in a circular movement of said movable carrier. The lifting condition occurs during the duration when the link pitch is shrunk, and the supporting condition occurs during the duration other than the lifting condition.

In addition, the bearing that consists of a single steel ball, or several steel balls in a circumference-form arrangement, may be installed at a bottom of a link axis jointing adjacent link plates. As for the single steel ball or several steel balls of circumference-form arrangement, because the steel ball turns on a bed which is a part of the guide, travel resistance is small. Because a travel of this bearing is a travel by a turn of a steel ball itself, it is possible to travel to all directions on the plane.

The bed or link axis may have a through-hole through which lubricants such as a small quantity of grease are supplied. The supply of lubricant is continuous or intermittent. In this case the lubricant should be selected to be one which has no drop point in the operation temperature of the machine. One example is fluorine lubricant for super temperature (about 260° C.).

DETAILED DESCRIPTION OF THE PREFERRED EMBODIMENT

As follows, referring to the drawings, one embodiment of the simultaneous biaxial stretching apparatus according to the present invention is explained.

Figure 1:
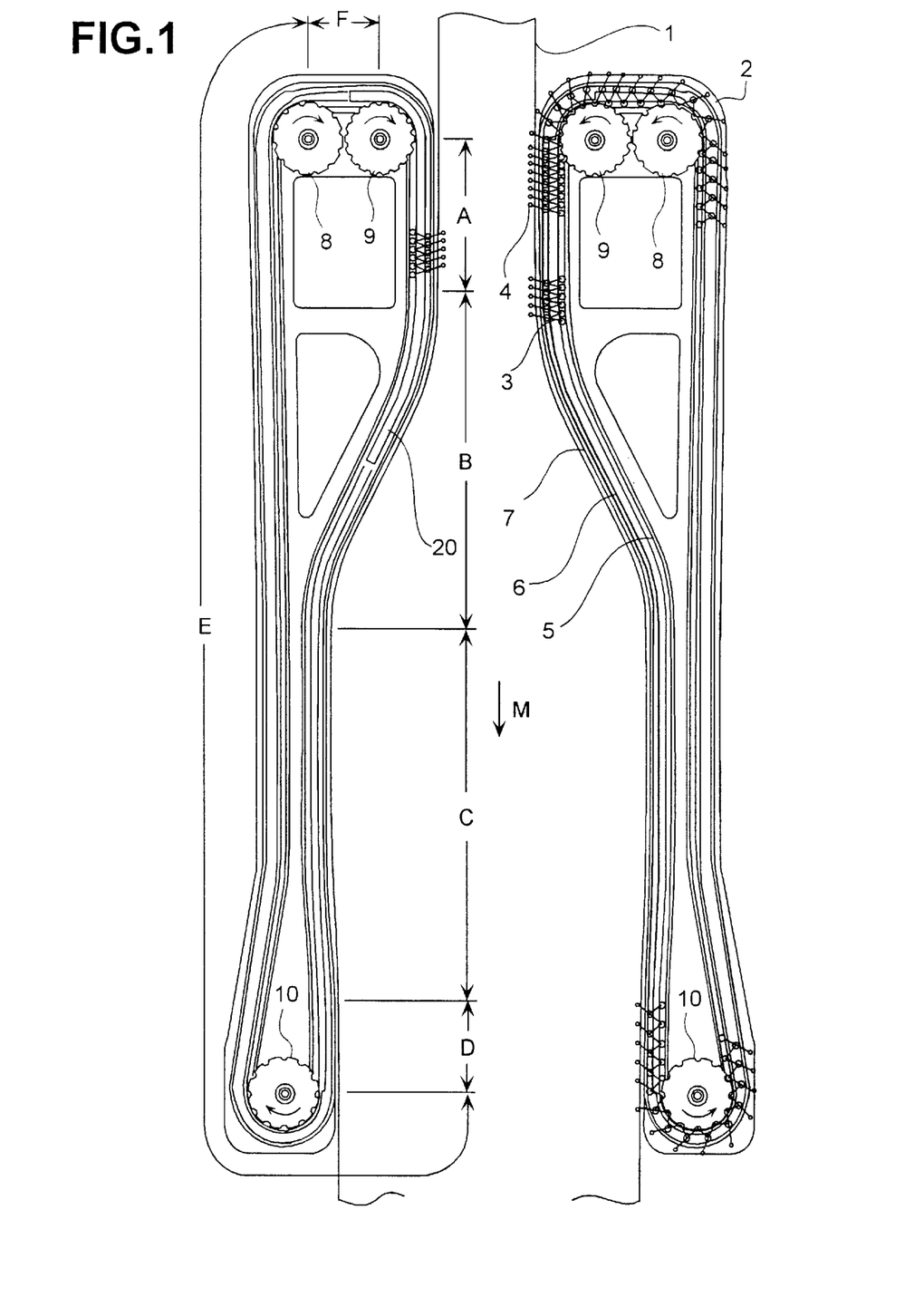
FIG. 1 is a whole plane view that shows one embodiment of the simultaneous biaxial stretching apparatus according to the present invention.

The basic structure of simultaneous biaxial stretching equipment is explained by using FIG. 1.

Figure 3:
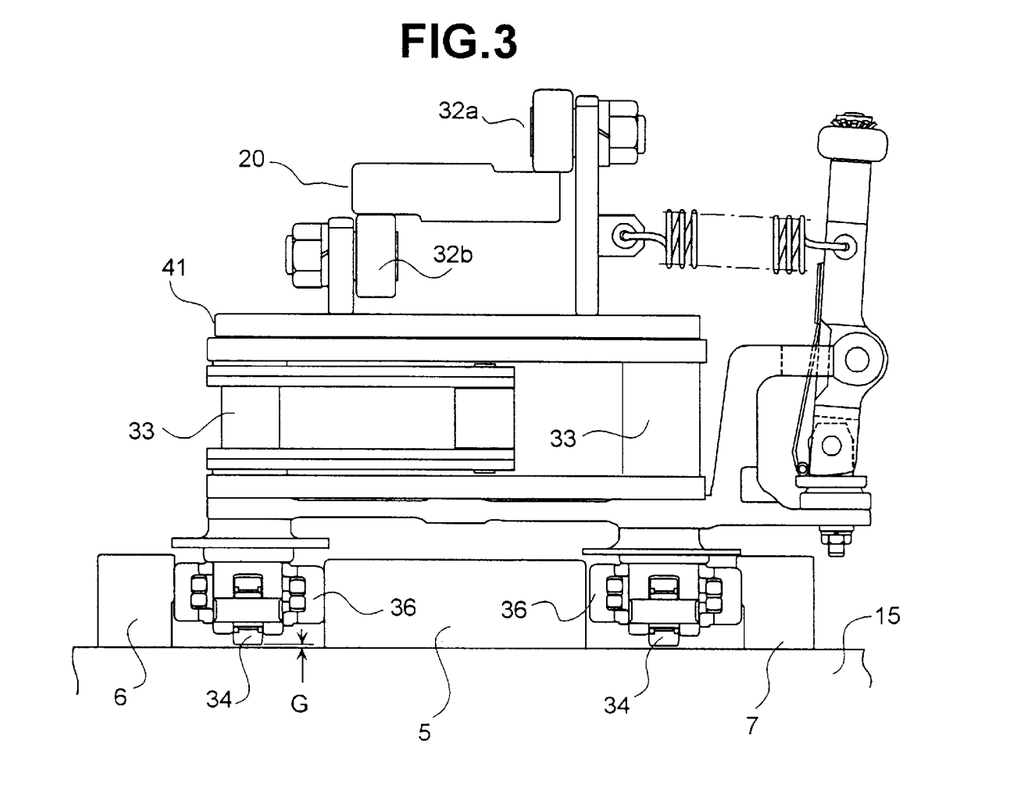
FIG. 3 is a vertical sectional view of a link traveling in a preheating section.
Figure 5:
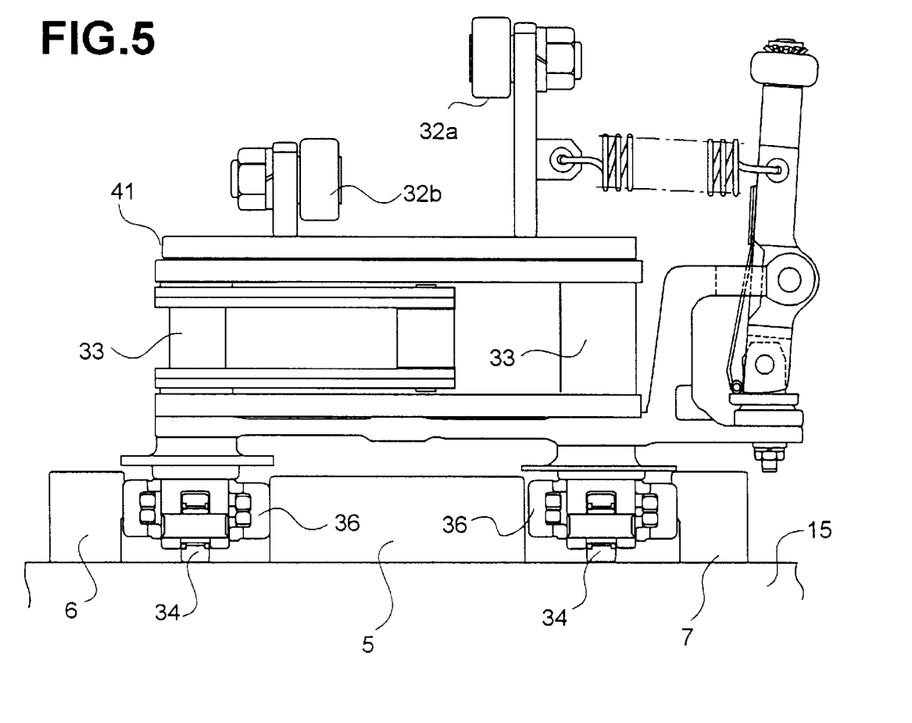
FIG. 5 is a vertical sectional view of a link in a section after a stretching section.

In FIG. 1, film or sheet 1 is supplied from an entrance (upper side in the figure), traveling toward an exit side (bottom side in the figure), and drawn out from the exit. A pair of endless links 2 are disposed symmetrically to sheet 1. Each endless link 2 comprises a plurality of link units 3 each having clip 4 to grasp edges of film 1. As seen in FIGS. 3 and 5, link plate 41 is sequentially connected with an adjacent link plate 41 through link axis 33, to form endless link 2. A space between the paired endless links 2 is narrow at the entrance side and wide at the exit side due to a divergence in stretching section B to stretch sheet 1 in a width direction as sheet 1 travels. In stretching section B, the traveling speed of the paired endless links 2 is also accelerated to stretch sheet 1 in the traveling direction as sheet 1 travels. Therefore, sheet 1 is simultaneously stretched in two directions perpendicular to each other in this section B. Endless link 2 is driven by sprockets 8, 9 and 10 to make a continuous (circular) rotation along bottom guide rails 5, 6 and 7 and upper guide rail 20.

Acceleration of the traveling speed of the pair of endless links 2 occurs by increase of the distance between adjacent link units 3 (increase of link pitch), due to different rotation speeds of sprockets 8, 9 and 10. Thus, since the rotation speed of sprockets 8 and 10 is higher (corresponding to the stretching ratio) than that of sprocket 9, stretching (increase) of the link pitch occurs between sprockets 9 and 10, and shrinking (decrease) of the link pitch occurs between sprockets 8 and 9. Of course, the link pitch is regulated or controlled by the width of bottom rail 5. This is conventional and can be seen in Japanese Patent Laid-Open Application No. 64-22531, published Jan. 25, 1989, the contents of which are incorporated hereby by reference in their entirety. Note especially FIGS. 2 and 3 of No. 64-22531.

Both sides of sheet 1 are grasped by clip 4 of link unit 3 at the entrance. Sheet 1 travels in a direction of arrow M by the circular (continuous) movement of the endless link 2, to pass through sections A, B, C and D. Sheet 1 is heated in sections A (preheating), B (stretching) and C (heat treatment for stabilization) and is cooled in section D. Bottom guide rails 5, 6 and 7, by which endless link 2 is guided, at both sides of sheet 1, have the distance therebetween increased in the width direction in section B. Also in section B, movement of endless link 2 is accelerated. Therefore, sheet 1 is drawn simultaneously in two directions in this section B. Stretched sheet 1 is heat-treated for stabilization in section C, so in the latter half of section C stretched sheet 1 is shrunk by some degree. Sheet 1 out of section D is rolled by a take-up machine.

Figure 2:
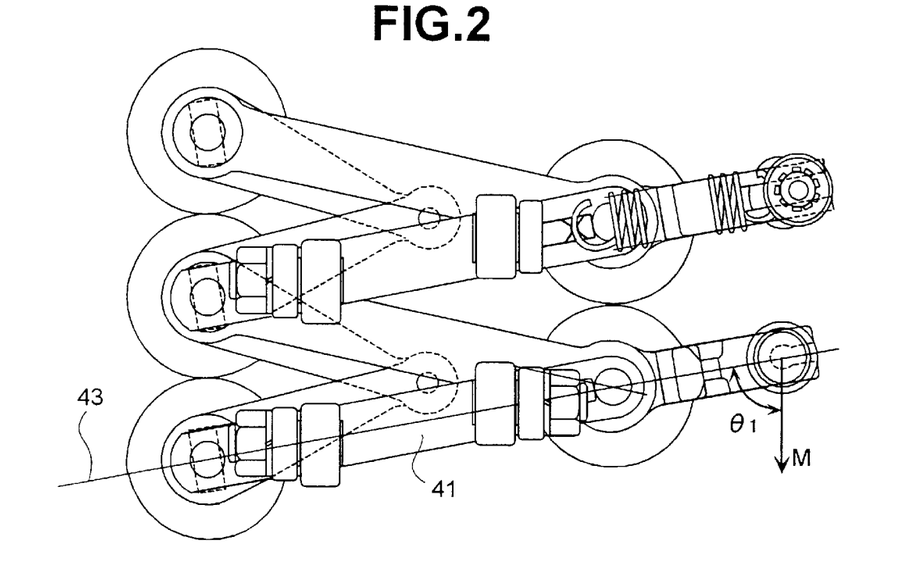
FIG. 2 is a plane view of links in a preheating section.
Figure 4:
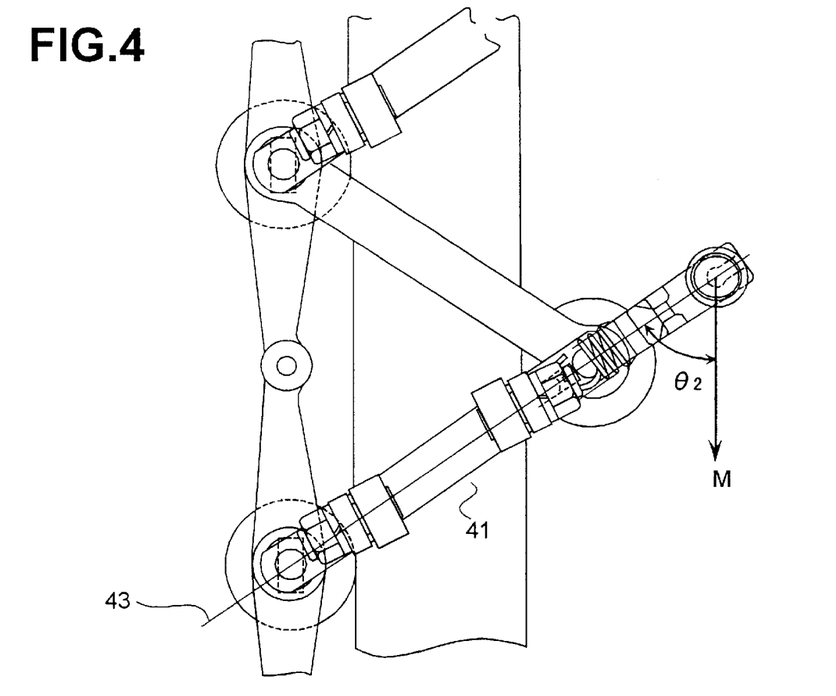
FIG. 4 is a plane view of a link in a section after a stretching section.

Each link unit 3 whose clip 4 is opened to release sheet 1 at the exit is returned to the entrance through sections E and F. A link pitch is enlarged in section B to accelerate movement of endless link 2 and is shortened in section F to prepare a next expansion of the link pitch. Two link units 3 having a shortest link pitch therebetween are shown in FIG. 2, and one link unit 3 of the largest link pitch is shown in FIG. 4.

Bottom guide rails 5, 6 and 7 that regulate a travel of endless link 2 are set at all travel sections, and upper guide rail 20 is installed in a lifting section from the middle part (e.g., mid-point) of section F to the middle part (e.g., mid-point) of section B.

Since endless link 2 is suspended by upper guide rail 20 in traveling along upper guide rail 20 in the lifting section, and has no contact to the bottom of bottom guide rails 5, 6 and 7 there, bottom guide rails 5, 6 and 7 are not always necessary in the lifting section where upper guide rail 20 is arranged. The link pitch of endless link 2 is a minimum in section A, as shown in FIG. 2, whereas it is maximum in an end part of section B, and in sections C, D, and E, as shown in FIG. 4. An open angle which is defined by the travel direction M and the direction of line 43 that is the center of link plate 41 is changed from $\theta_1$ to $\theta_2$ and from $\theta_2$ to $\theta_1$, as endless link 2 circulates along guide rails 5, 6 and 7 and 20. Therefore, the angle difference of the open angle is ($\theta_2$31 $\theta_1$). Illustratively, and not to be limiting, in one model $\theta_1$ is 79.0° and $\theta_2$ is 55.15°. These values for $\theta_1$ and $\theta_2$ can vary.

As the angle difference ($\theta_2-\theta_1$) is large, the bearing and the guide rail receive large formation power or friction power, and a life thereof is decreased. Because the above angle difference enlarges in the lifting section from the middle part of section F to the middle part of section B, in this lifting section upper guide rail 20 is provided to lift the endless link 2 to make a bearing mechanism free from the bottom of guide rails 5, 6 and 7 (and which can be free entirely of guide rails 5, 6 and 7). To change this drive state (suspension state and placement state), upper rollers 32a and 32b to engage at upper rail 20 is provided at the upper side of link unit 3 and bottom roller 34 to support the weight of link 2 is provided at the bottom side of link unit 3. That is, upper rollers 32a and 32b roll along upper guide rail 20, and link 2 becomes in a suspension state in the lifting section; bottom roller 34 rotates and moves along bottom guide rails 5, 6 and 7 in the section other than the lifting section, and endless link 2 becomes a placement state.

Because endless link 2 is driven by rotation of upper rollers 32a and 32b or bottom roller 34 in all sections, it is possible for endless link 2 to travel at high speed with a small travel resistance and high stabilization. Accordingly, a large amount of lubricant is unnecessary for the rails, and oil dirt is prevented.

The direction of movement of upper rollers 32a and 32b is set to a travel direction in the lifting section (FIG. 3), whereas the direction of bottom roller 34 is greatly shifted from the direction of the travel direction. In this condition bottom roller 34 does not contact the surface of bed 15, since the height of upper rail 20 is set to have a gap G between a lowest point of bottom roller 34 and the surface of bed 15. So no friction is produced between bottom roller 34 and bed 15. This state is shown in FIG. 3.

The provision of one pair of upper rollers 32a and 32b to stabilize the travel in the suspended state is improved by having upper rollers 32a and 32b respectively be on opposite sides of upper guide rail 20 to hold upper guide rail 20 up and down as shown in FIG. 3. On the other hand, in a section other than the lifting section endless link 2 travels along bottom rails 5, 6 and 7 by rotation of bottom roller 34 and radial roller 36 inserted between vertical walls of rails 5 and 6 and between vertical walls of rails 5 and 7 (the rails forming tracks therebetween) as shown in FIG. 5.

The direction of bottom roller 34 is set to a travel direction when link unit 3 is opened or link pitch is at a maximum as shown in FIG. 4. In this case, while the direction of upper rollers 32a and 32b greatly deviates from a travel direction, endless link 2 is supported by bottom roller 34. Because upper rollers 32a and 32b do not contribute to a support of endless link 2, there is no obstacle due to this deviation. Radial bearing 36 is installed in the upper part of bottom roller 34, and radial bearing 36 is guided by a groove between guide rails 5 and 6 and between guide rails 5 and 7, so rollers 34 and 36 travel along a specified track defined by guide rails 5, 6 and 7.

Figure 6:
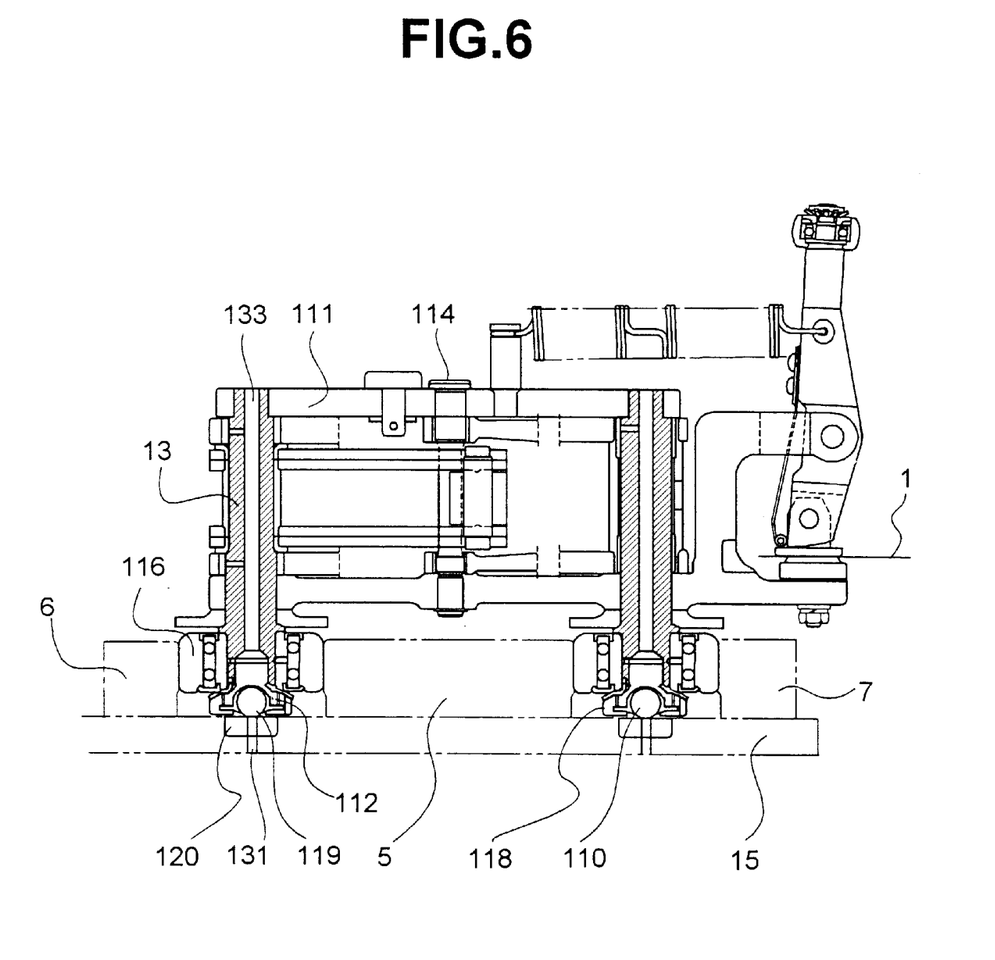
FIG. 6 is a vertical sectional view that shows an example of the link that uses a ball bearing having a single steel ball.

FIG. 6 is the vertical sectional view that shows an example of link unit 3 having a ball bearing that is formed out of a single steel ball. Link plate 111 is connected to other link plates through link axis 113 or link pin 114, and an endless loop is formed. In this ball bearing structure, steel ball holder 112, having a hole in which steel ball 110 is installed, is provided in the most lower part of link axis 113. Steel ball 110 is installed in the hole of steel ball holder 112. To prevent steel ball 110 from falling and to prevent an alien substance from adhering to steel ball 110 when link unit 3 is lifted up, cover 118 is provided in steel ball bearing 112. On the other hand, bed 15 on which steel ball 110 rotates is composed of antiabrasion material 120, R-shaped groove 119 is formed in an upper surface of antiabrasion material 120, and steel ball 110 travels on R-shaped groove 119. Because steel ball 110 rolls on the R-shaped groove 119, steel ball 110 can travel along any direction defined by R-shaped groove 119 on the plane. Moreover, this movement by a relatively small force is possible. Radial bearing 116 is installed in link axis 113 at the position of the upper part of steel ball holder 112. Radial bearing 116 is regulated and travels in the guidance groove formed by guide rails 5, 6 and 7. Therefore, link axis 113 travels along the locus of guide rails 5, 6 and 7 by a travel of steel ball 110 on the R-shaped groove 119 and a travel of radial bearing 116 in the guidance groove.

As shown in FIG. 6, through-hole 131 provided in bed 15 or through-hole 133 provided in link axis 113 is provided for a supply of lubricant. The lubricant of small quantity is automatically and intermittently supplied to steel ball holder 112. Heat treatment for film stretching is done under, for example, 200° or 300° C. high temperature. Therefore, it is useful for a lubricant to have no drop point in the heat-treating temperature range, for scattering prevention. For example, fluorine grease for a super high temperature, such as "BARRIERTA L55/2", produced by NOK KLUBER (a joint company of Nippon Oilseal Kogyo and KLUBER LUBRICATION MUNCHEN KG), is suitable.

In case steel ball 110 or steel ball holder 112 is worn, and an exchange is necessary, an ejection rod is inserted in through-hole 133 from the upper part of link axis 113. The bearing unit that consists of steel balls 110, steel ball holder 112 and cover 118 is pushed out by inserting this rod and is replaced with a new bearing unit. In case bed 15 is worn, antiabrasion material 120 is exchanged.

Figure 7:
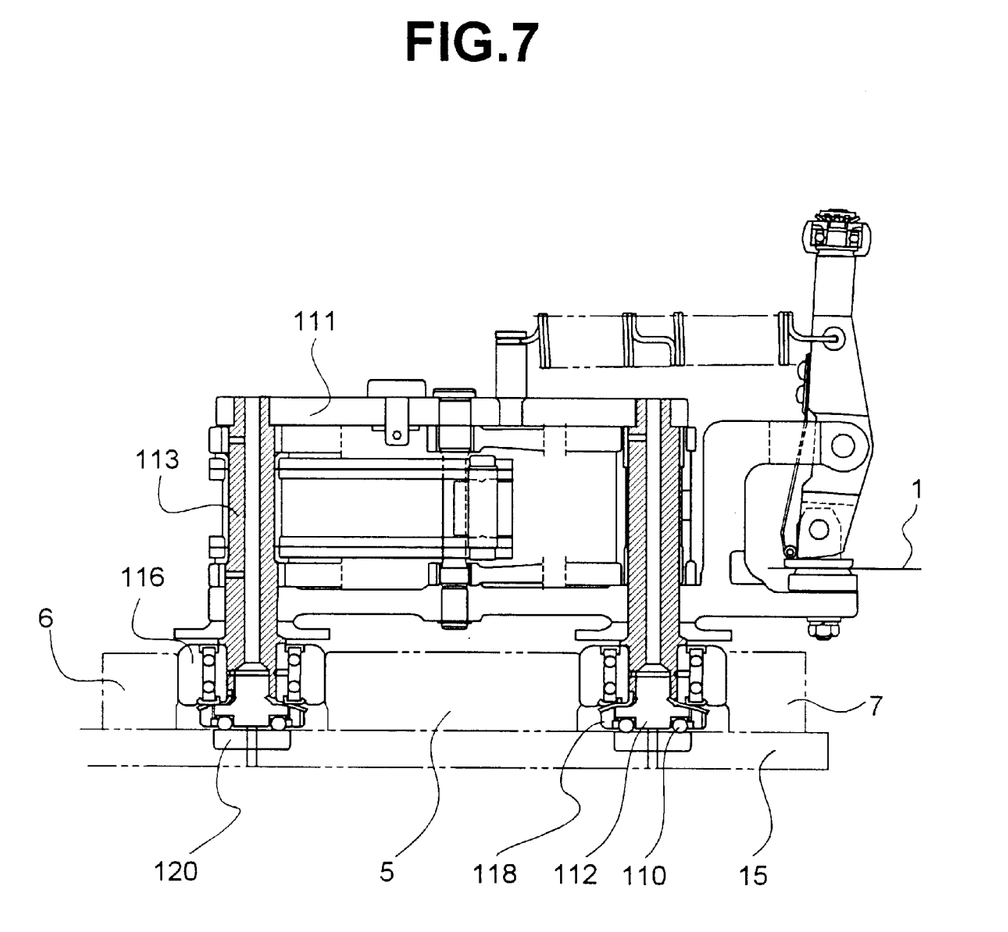
FIG. 7 is a vertical sectional view that shows an example of the link that uses a ball bearing having five steel balls.
Figure 8:
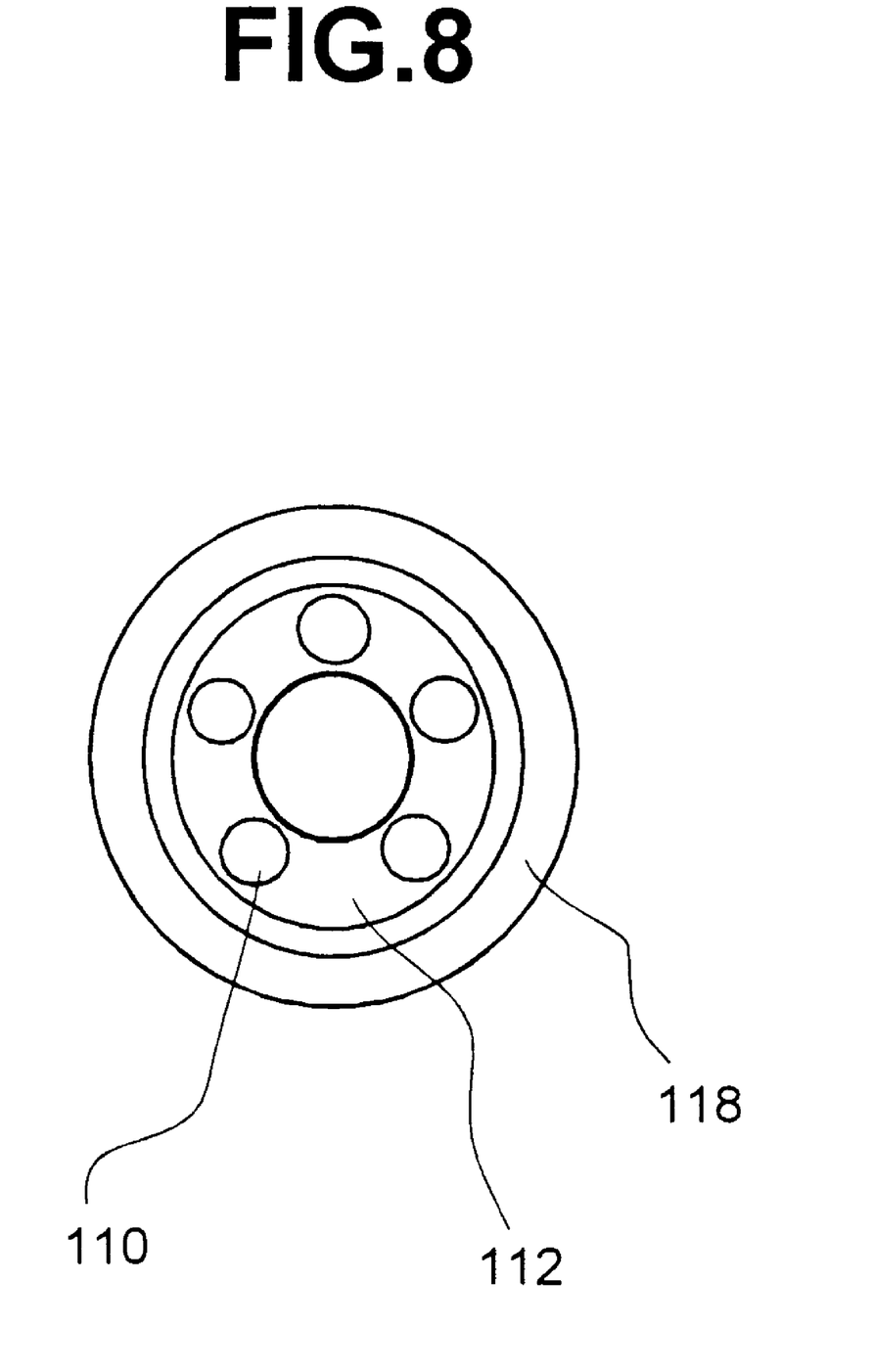
FIG. 8 is a cross sectional view of the example of the link that uses a ball bearing having five steel balls, as seen from the under-surface side.

In case the object film 1 is thick or in case the tensile strength of the object film is high, the link apparatus is enlarged, so the load that acts on steel ball 110 is large. A life of the bearing then becomes a problem due to wear by friction. To solve the above problem, the number of steel balls 110 is increased as shown in FIG. 7, to decrease face pressure. In this case, as for steel ball 110, a symmetrical point arrangement on the circumference, like the indication in FIG. 8, is preferred.

According to the present invention, it is possible to achieve biaxial stretching of the film at high speed travel, with high stabilization, since travel resistance is small due to use of rolling friction and not sliding friction. It is sufficient to use only a small amount of lubricant, since travel is by rolling of a steel ball as compared to a travel by sliding (which needs much lubricant). In addition, lubricants such as viscous grease that are hard to scatter can be used. As a result, the problem of oil dirt also is overcome. In addition, because a rolling roller is turned to a travel direction, a thrust load cannot act, and a long life of the bearings and of the rails can be expected.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. An apparatus for stretching a film simultaneously in biaxial directions, comprising:

a pair of movable carriers having a plurality of link units, each link unit having clips to grasp edges of a continuous web of film, the pair of movable carriers further having upper rollers and bottom rollers;

a pair of guides for guiding said movable carriers, said pair of guides defining a simultaneous stretching area wherein said guides diverge to stretch said web in a direction transverse to a direction of film travel and simultaneously stretch the film longitudinally in the direction of film travel by acceleration of the film between said carriers, each guide having bottom rail structure for guiding said movable carriers by said bottom rollers and upper rail structure for lifting and guiding said movable carriers by said upper rollers.

2. An apparatus according to claim 1, wherein said upper rail structure is provided to lift said link units from said bottom rail structure, when shortening a link pitch between adjacent link units, in a zone before said simultaneous stretching area.

3. An apparatus according to claim 1, wherein each of said bottom rollers comprises a single steel ball.

4. An apparatus according to claim 1, wherein each of said bottom rollers comprises a plurality of steel balls.

5. An apparatus according to claim 1, wherein said bottom rail structure includes rails forming tracks on which the bottom rollers can roll.

6. An apparatus according to claim 1, wherein the pair of movable carriers further comprise radial rollers adjacent the bottom rail structure, for rolling against the bottom rail structure.

7. An apparatus according to claim 1, wherein the movable carriers move through two zones, a first zone where the movable carriers are lifted and guided by the upper rail structure, and a second zone where the movable carriers are supported and guided by the bottom rail structure.

8. An apparatus according to claim 1, wherein the bottom rail structure includes bottom rails provided on a bed, the bottom rollers rolling between the bottom rails on the bed.

9. An apparatus according to claim 8, wherein said bed includes an insert of antiabrasion material, upon which said bottom rollers roll.

10. An apparatus according to claim 1, wherein said upper rail structure is positioned such that when respective link units of the movable carriers are lifted and guided by the upper rail structure the bottom rollers of said respective link units are not in contact with the bottom rail structure.

11. An apparatus for stretching a film simultaneously in biaxial directions, comprising:

a pair of endless links having a plurality of link units sequentially connected, each link unit having a clip to grip edges of a continuous web of film, an axis shaft, and a ball bearing and thrust bearing provided at the bottom of said axis shaft;

a pair of guides for guiding said endless links, each guide having a bottom surface for supporting said ball bearing and a pair of side surface for holding said thrust bearing therebetween; and a sprocket provided for each endless link for driving said endless link.

12. A method for stretching a film simultaneously in biaxial directions, comprising the steps of:

providing a pair of movable carriers having a plurality of link units, each link unit having clips to grasp edges of a continuous web of film, the pair of movable carriers further having upper rollers and bottom rollers;

providing a pair of guides for guiding said movable carriers, said pair of guides defining a simultaneous stretching area where said guides diverge to stretch said web in a direction transverse to a direction of film travel and simultaneously stretch the film longitudinally in the direction of film travel by acceleration of the film between said carriers;

lifting link units of said movable carriers and shortening a link pitch between link units; and stretching said web of film after said step of lifting.

13. A method according to claim 12, wherein said stretching is initiated while said link units of said movable carrier are lifted.

14. A method according to claim 12, wherein said stretching is performed by increasing the link pitch between link units.

15. A method according to claim 12, wherein the clips of the link units grasp the edges of the continuous web of film after the link pitch has been shortened and prior to stretching the web of film.

16. A method according to claim 12, comprising the further step of lowering said link units of said moveable carriers after said stretching has been initiated.

17. A method according to claim 12, wherein said movable carriers include bottom rollers that roll on a surface, and in lifting link units of the movable carriers the bottom rollers are lifted off said surface.

* * * * *